(12) United States Patent
Yoshibe et al.

(10) Patent No.: US 7,744,295 B2
(45) Date of Patent: Jun. 29, 2010

(54) APERTURE MECHANISM, OPTICAL APPARATUS AND MANUFACTURING METHOD THEREOF

(75) Inventors: Koushi Yoshibe, Kawasaki (JP); Makoto Fujiwara, Yokohama (JP)

(73) Assignee: Nikon Corporation, Tokyo (JP)

( * ) Notice: Subject to any disclaimer, the term of this patent is extended or adjusted under 35 U.S.C. 154(b) by 192 days.

(21) Appl. No.: 11/961,331

(22) Filed: Dec. 20, 2007

(65) Prior Publication Data
US 2008/0260376 A1  Oct. 23, 2008

(30) Foreign Application Priority Data

Dec. 25, 2006 (JP) ............................. 2006-348242
Jan. 17, 2007 (JP) ............................. 2007-007731

(51) Int. Cl.
G03B 9/02 (2006.01)

(52) U.S. Cl. ...................................... 396/509
(58) Field of Classification Search ................ 396/505, 396/448, 458, 509
See application file for complete search history.

(56) References Cited

U.S. PATENT DOCUMENTS

| 3,780,636 | A | 12/1973 | Klupsch et al. |
| 4,322,154 | A * | 3/1982 | Hashimoto et al. .......... 396/505 |
| 4,525,037 | A * | 6/1985 | Metabi ........................ 359/740 |
| 4,634,250 | A | 1/1987 | Koiwai |
| 4,636,041 | A * | 1/1987 | Kotaka et al. ................ 359/694 |
| 5,361,243 | A * | 11/1994 | Kasahara .................. 369/44.15 |
| 5,410,432 | A * | 4/1995 | Kobayashi ................... 359/740 |
| 5,671,449 | A | 9/1997 | Shimizu |
| 5,884,110 | A * | 3/1999 | Iikawa et al. ................. 396/509 |
| 6,312,168 | B1 * | 11/2001 | Naruse et al. ............... 396/349 |

FOREIGN PATENT DOCUMENTS

| DE | 1295360 | | 5/1969 |
| JP | 7-23778 | Y2 | 5/1995 |
| JP | 10031247 | * | 7/1996 |
| JP | 2559958 | Y2 | 9/1997 |

* cited by examiner

Primary Examiner—W. B. Perkey
Assistant Examiner—Noam Reisner
(74) Attorney, Agent, or Firm—Ditthavong Mori & Steiner, P.C.

(57) ABSTRACT

To provide an aperture mechanism and an optical apparatus which are reduced in size. The aperture mechanism comprising: a driving member to be driven in accordance with an aperture operation; an aperture member having an aperture to be driven by the driving member; a first engagement section connected to one of the driving member and the aperture member; a second engagement section connected to another one of the driving member and the aperture member and engaged with the first engagement section; and a biasing member connected to at least one of the driving member and the aperture member to provide a bias in a direction in which the first engagement section and the second engagement section are facing to each other.

31 Claims, 8 Drawing Sheets

APERTURE MECHANISM, OPTICAL APPARATUS AND MANUFACTURING METHOD THEREOF The disclosure of the following priority application is herein incorporated by reference: Japanese Patent Applications No. 2006-348242 filed on Dec. 25, 2006 and No. 2007-007731 filed on Jan. 17, 2007.

BACKGROUND OF THE INVENTION

1. Field of the Invention

The invention relates to an aperture mechanism, an optical apparatus and a manufacturing method thereof.

2. Description of Related Art

In the prior art, aperture devices for interchangeable lenses are known, which can improve the operational conditions and durability of an aperture narrow-down lever, for instance, from Japanese Utility Model Registration No. 2,559,958.

In recent years, however, there has been a trend to make cameras more compact, and it has been desired to reduce the size of their aperture mechanisms.

SUMMARY OF THE INVENTION

An object of the present invention is to provide a miniaturized aperture mechanism and optical apparatus.

The present invention achieves the above-mentioned object by solving the problem by the means mentioned below.

The first aspect of the present invention is an aperture mechanism comprising: a driving member to be driven in accordance with an aperture operation; an aperture member having an aperture to be driven by the driving member; a first engagement section connected to one of the driving member and the aperture member; a second engagement section connected to another one of the driving member and the aperture member and engaged with the first engagement section; and a biasing member connected to at least one of the driving member and the aperture member to provide a bias in a direction in which the first engagement section and the second engagement section are facing to each other.

In the aperture mechanism, at least one of the first engagement section and the second engagement section may be a projection.

In the aperture mechanism, the biasing member may be a leaf spring.

In the aperture mechanism, the biasing member may be fixed by caulking.

In the aperture mechanism, the biasing member may be provided with a disengagement prevention section to prevent the biasing member from being disengaged from an object to be biased.

The second aspect of the present invention is an aperture mechanism comprising: a first member to rotate in accordance with an aperture operation a rotation regulating section having a first inclined surface inclined with respect to a rotational axis of the first member to regulate rotation of the first member; a second member having a second inclined surface that is provided inclined with respect to the rotational axis and transfers the rotational driving force between the second inclined surface and the first member, to rotate in accordance with the aperture operation.

In the aperture mechanism, the first inclined surface and the second inclined surface may be inclined in the same direction from the viewpoint of the rotational direction about the rotational axis.

In the aperture mechanism, the first member may comprise a biasing member to bias the second inclined surface of the second member.

In the aperture mechanism, the second member may have a third inclined surface provided on a side opposite to the second inclined surface, and the first member may have a projection section opposed to the third inclined surface.

In the aperture mechanism, the inclination of the third inclined surface with respect to a line parallel with the rotational axis may be smaller than the inclination of the second inclined surface, and when the first member and the second member relatively move along the rotational axis in a direction in which an aperture becomes small, a clearance may occur between the third inclined surface and the projection section.

In the aperture mechanism, the first member and the second member may relatively move along a direction of the rotational axis.

In the aperture mechanism, the first member may rotate in accordance with the driving force provided by the second member to perform the aperture operation.

The third aspect of the present invention is an aperture mechanism provided with: a driving member to be driven in accordance with an aperture operation; an aperture member having an aperture to be driven by the driving member; a first engagement section connected to one of the driving member and the aperture member; a second engagement section connected to another one of the driving member and the aperture member and engaged with the first engagement section; a biasing member provided on at least one of the driving member and the aperture member to bias one of the first engagement section and the second engagement section to another one of the first engagement section and the second engagement section so that the first engagement section comes into contact with the second engagement section even when changing a focal length of a photographing device.

In the aperture mechanism, the aperture member may rotate in accordance with an aperture operation, and the driving member has a second inclined surface that is provided inclined with respect to a rotational axis of the aperture member and transfers the rotational driving force between the second inclined surface and the aperture member, to rotate in accordance with the aperture operation.

In the aperture mechanism, a rotation regulating section may have a first inclined surface inclined with respect to a rotational axis of the aperture member to regulate rotation of the aperture member.

In the aperture mechanism, the second member may have a third inclined surface provided on a side opposite to the second inclined surface, and the first member may have an abutting section capable of abutting against the third inclined surface.

In the aperture mechanism, when a focal length of the photographing device may be a predetermined focal length, the third inclined surface and the abutting section abut against each other.

In the aperture mechanism, when a focal length of the photographing device may shorter than the predetermined focal length, the third inclined surface and the abutting section do not abut against each other.

The forth aspect of the present invention is an optical apparatus comprises the above mentioned aperture mechanism.

The fifth aspect of the present invention is a manufacturing method for an aperture mechanism, including steps of: providing a first engagement section on one of a driving member driven in accordance with an aperture operation and an aperture member having an aperture to be driven by the driving member; providing a second engagement section to be engaged with the first engagement section at another one of the driving member and the aperture member; and providing a biasing member to bias a direction in which the first engagement section and the second engagement section are facing to each other on at least one of the driving member and the aperture member.

In the manufacturing method for an aperture mechanism at least one of the first engagement section and the second engagement section may be a projection.

The sixth aspect of the present invention is a manufacturing method for an aperture mechanism, including steps of: disposing a rotation regulating section having a first inclined surface inclined with respect to a rotational axis of a first member that rotate in accordance with an aperture operation, in such a manner that rotation of the first member can be regulated; and disposing a second member having a second inclined surface that is provided inclined with respect to the rotational axis and transfers the rotational driving force between the second inclined surface and the first member, in such a manner that the second member can be rotate in accordance with the aperture operation.

In the manufacturing method for an aperture mechanism the first inclined surface and the second inclined surface may be inclined in the same direction from the viewpoint of the rotational direction about the rotational axis.

According to the present invention, it is possible to provide a miniaturized aperture mechanism and optical apparatus.

DETAILED DESCRIPTION OF THE INVENTION

A more detailed description will be given hereinafter for embodiments of the present invention with reference to the drawings and more. It should be noted that an optical apparatus of the present invention may be, for example, a still camera, video camera, lens barrel or the like, but the following embodiments will be described by taking an example of a single-lens reflex type camera.

First Embodiment

Figure 1:
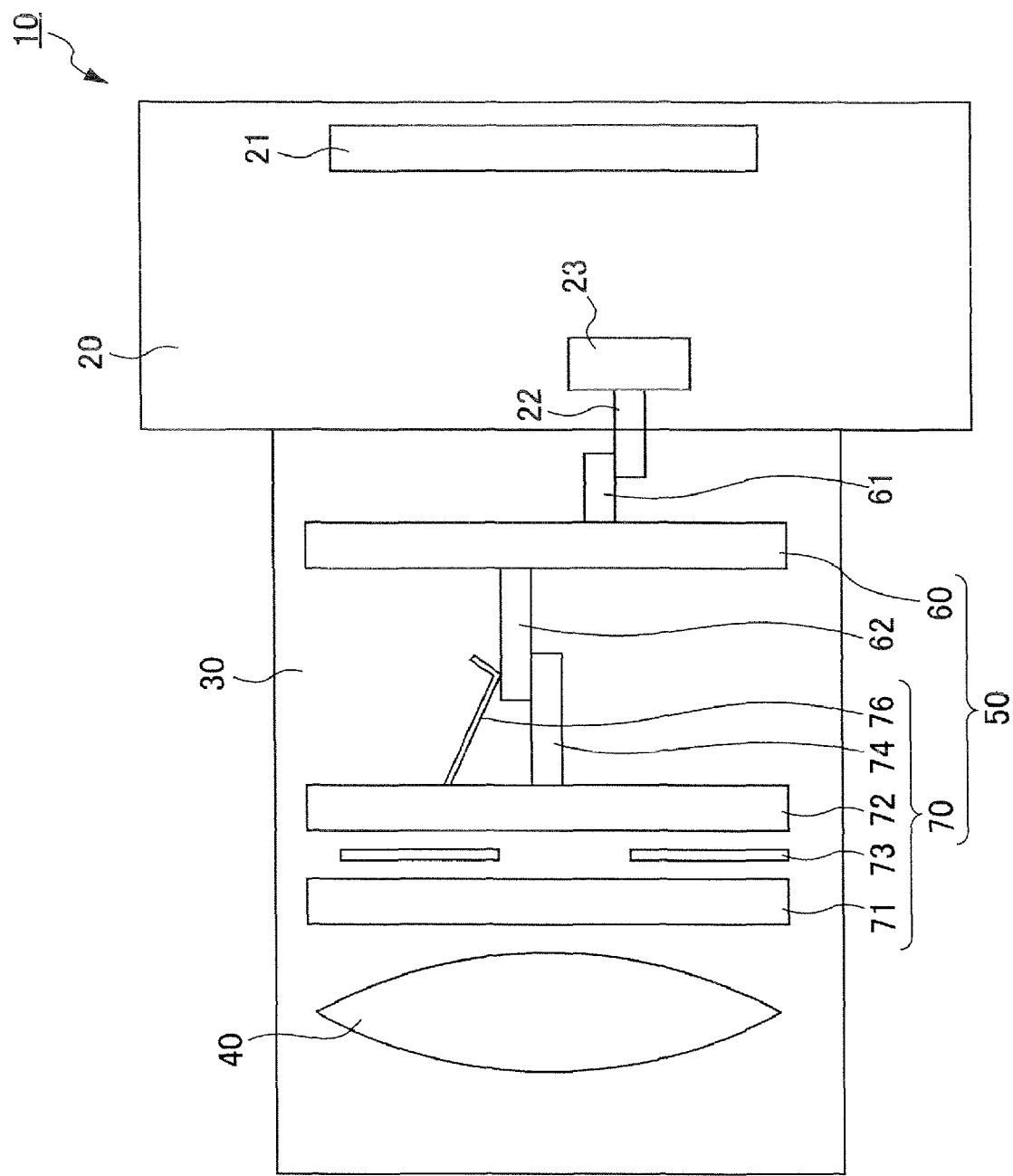
FIG. 1 is a schematic diagram showing a camera of the first embodiment.

FIG. 1 is a schematic diagram showing a camera of the first embodiment.

A camera 10 is provided with a camera body 20 and a lens barrel 30.

The camera body 20 is provided with an image pickup device 21 for converting an optical image of a subject to be imaged into an electrical signal, a body-side interlocking section 22 located on the body side for setting an aperture, and a driving section 23 for driving the body-side interlocking section 22.

The lens barrel 30 is an interchangeable lens that can be detached from and attached to the camera body 20. It should be noted that the present embodiment concerns an example in which the lens barrel 30 is an interchangeable lens, but the invention is not limited to this example and the lens barrel may be of a type integrated with the camera body.

The lens barrel 30 is provided with a lens 40 and an aperture mechanism 50 for adjusting the aperture condition of the lens 40. The aperture mechanism 50 is provided with: an aperture plate member 60 having a lens-side interlocking section 61 located on the lens side for setting the aperture, etc.; an aperture unit 70 having a supporting member 71, a cam member 72, aperture blades 73, etc.; and so on. It is noted that the details of the aperture mechanism 50 will be described later.

Figure 2:
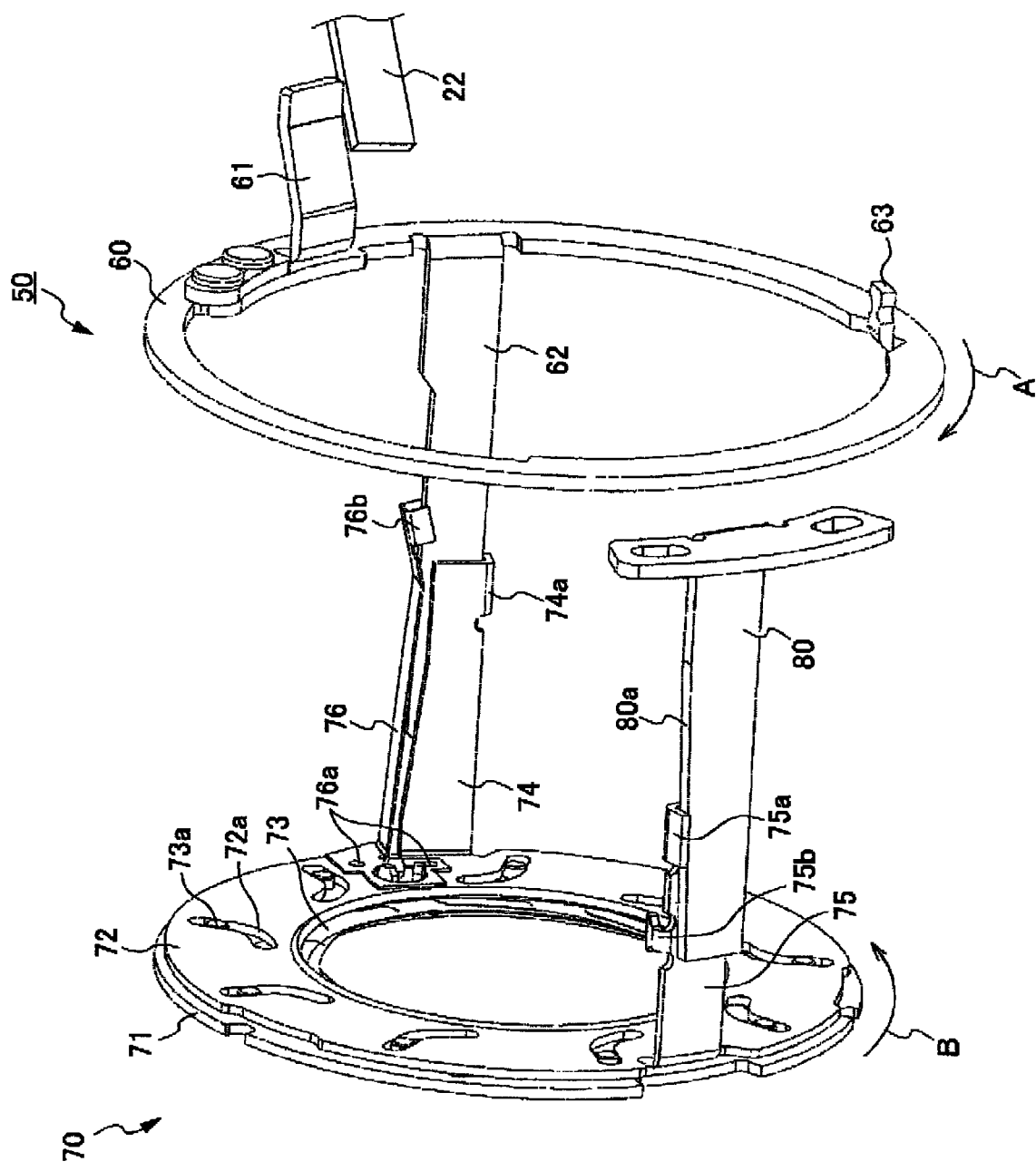
FIG. 2 is a view showing details of an aperture mechanism of the first embodiment.

FIG. 2 is a view showing the details of the aperture mechanism of the first embodiment.

The aperture mechanism 50 is provided with an aperture plate member 60 disposed on the side of the camera body 20 (see FIG. 1), an aperture unit 70 disposed on the side of the lens 40 (see FIG. 1), and a rotation-limiting plate 80 disposed between the aperture plate member 60 and the aperture unit 70.

The aperture plate member 60 is a ring-shaped rotational member, which is driven in accordance with an aperture operation, and provided with a lens-side interlocking section 61, a driving projection section 62 and a spring hitch section 63.

The lens-side interlocking section 61 extends to the side of the camera body 20 (see FIG. 1), and is a member that operates in conjunction with the body-side interlocking section 22 provided on the camera body 20.

The driving projection section 62 is an arm-like member extends towards the side of the aperture unit 70, and is engaged with a first aperture projection section 74 described later.

The driving projection section 62, for example, may be made by folding a portion corresponding to the driving projection section 62 from a piece including the portion and the aperture plate member 60 formed by press working.

The spring hitch section 63 is a member for hitching a spring (not shown), and by virtue of the spring, the aperture plate member 60 is biased in the direction of the arrow A.

The aperture unit 70 is a unit driven by the aperture plate member 60 to perform aperture operations, and is provided with a supporting member 71, a cam member 72, aperture blades 73, a first aperture projection section 74, a second aperture projection section 75, and a leaf spring 76.

The supporting section 71 is a so-called honeycomb provided inside the lens barrel 30 (see FIG. 1), and is a ring-shaped member which moves in a direction along the optical axis in the event of a zoom operation of a photographing optical system including the lens 40, and is provided with holes, not shown.

The cam member 72 is a so-called arrow wheel, and is a rotatable ring-shaped member, and is provided with a cam groove 72a.

A plurality of aperture blades 73 are arranged between the supporting member 71 and the cam member 72. The blades 73 are bow-shaped members for controlling the opening and closing of the aperture. In each of the aperture blades 73, there is formed a pin, not shown, protruding to a side of the supporting member 71 and being fitted into the hole of the supporting member 71, and a pin 73a engaged with the cam groove 72a of the cam member 72.

The first aperture projection section 74 is an arm-like member extending towards a side of the aperture plate member 60, and having an extremity with an L-shaped hook section 74a formed, the L-shaped hook section 74a being engaged with the driving projection section 62.

The first aperture projection section 74, for example, may be made by folding a portion corresponding to the first aperture projection section 74 from a piece including the portion and the cam member 72 formed by press working.

The second aperture projection section 75 is an arm-like member extending in a symmetrical portion on the same face side as the first aperture projection section 74 to a side of the aperture plate member 60, and is provided with an L-shaped hook section 75a engaged with a rotation-limiting plate 80, described later, and a spring hitch section 75b.

The second aperture projection section 75, for example, may be made by folding a portion corresponding to the second aperture projection section 75 from a piece including the portion and the cam member 72 formed by press working.

The spring hitch section 75a is a member for hitching a spring, not shown, and the spring causes the cam member 72 to be biased in the direction of the arrow B.

The leaf spring 76 is fixed to the cam member 72 at caulking sections 76a by means of caulking, and is a member for providing a bias in a direction in which the driving projection section 62 and the first aperture projection section 74 come into contact with each other (in a direction in which the driving projection section 62 and the first aperture projection section 74 are facing to each other).

More specifically, the leaf spring 76 sandwiches the driving projection section 62 between the leaf spring 76 and the first aperture projection section 74 in a direction along a rotational direction of the cam section 72 and the aperture plate member 60, and is spring-biased with an amount of force such no wobble can occur at the time of rotation of the cam member 72 and aperture plate member 60.

In addition, the leaf spring 76 biases the vicinity of the portion in which the driving projection section 62 and the first aperture projection section 74 are engaged with each other (the vicinity of the L-shaped hook section 74a).

Moreover, an extremity of the leaf spring 76 has a pinch section 76b formed, that pinches a driving projection section 62 in a radial direction of the cam member 72 and aperture plate member 60 so as to prevent the leaf spring 76 from being disengaged from the driving projection section 62.

The rotation-limiting plate 80 is a member fixed within the lens barrel 30 (see FIG. 1) for limiting the rotation of the cam member 72 by abutting the L-shaped hook section 75a of the second aperture projection section 75.

The rotation-limiting plate 80 also has a F-value correction inclined surface 80a for correcting the amount of rotation of the cam member 72 through zooming. Sliding of the second aperture projection section 75 on this F-value correction inclined surface 80a causes the initial position of the second aperture projection section 75 to be changed, and thereby the diameter of the aperture can be corrected.

For example, if the zoom position is at the wide-angle end (Wide), then the aperture unit 70 is closest to the aperture plate member 60, and the initial position of the second aperture projection section 75 moves upward in FIG. 2 and the cam member 72 rotates in the direction opposite to arrow B so that the aperture blades 73 emerge to decrease the aperture diameter. On the other hand, if the zoom position is at the telephoto end (Tele), then the initial position of the second aperture projection section 75 moves downward in FIG. 2 as the aperture unit 70 gets further from the aperture plate member 60, and the cam member 72 rotates in the direction of arrow B so that the aperture blades 73 are retracted to increase the diameter of the aperture.

Next, an explanation will be given for the operation of the aperture mechanism 50 of the first embodiment using FIGS. 1 and 2.

Upon starting the operation of the aperture, at first, the body-side interlocking section 22 provided for the camera body 20 (see FIG. 1) is withdrawn from the lens-side interlocking section 61 of the lens barrel 30, and the aperture plate member 60 rotates in the direction of the arrow A in FIG. 2.

Then, the rotational movement of the aperture plate member 60 is transferred to the cam member 72 by virtue of the engagement and coupling between the driving projection section 62 of the aperture plate member 60 and the first aperture projection section 74 of the aperture unit 70. At this time, since the leaf spring 76 provides a bias in the direction in which the driving projection section 62 and the first aperture projection section 74 come into contact with each other (in a direction in which the driving projection section 62 and the first aperture projection section 74 are facing to each other), the cam member 72 can follow the rotational movement of the aperture plate member 60 without wobbling.

With the rotation of the cam member 72, the aperture blades 73 having the pin 73a engaged with the cam groove 72a (see FIG. 2) provided for the cam member 72 rotate and decrease the diameter of the aperture. It should be noted that on the contrary to the above-described operation, if the body-side interlocking section 22 pushes up the lens-side interlocking section 61 of the lens barrel 30, then the diameter of the aperture can be increased.

Thus, according to the first embodiment, the following advantages are offered.

(1) Since the cam member 72, by virtue of the leaf spring 76, can follow the rotational movement of the aperture plate member 60 with no wobble, it is possible to open and close the aperture blades 73 with high accuracy and create the desired diameter of the aperture.

(2) If there were no leaf spring 76, the aperture plate member 60 and the cam member 72 would both undergo a unidirectional force at the abutment contact portions of their respective projected portions, and thereby an leaning may occur due to wobbling of engagement; however, the present embodiment provides a bias using the leaf spring 76 mounted on the cam member 72, so as to exert the biasing force of the leaf spring 76 only on the aperture plate member 60 and the cam member 72 (internalization of force), and therefore it is possible to prevent the leaning.

(3) As one conventional leaning prevention method, there is a method in which an anti-leaning member is provided between the aperture plate member 60 and the aperture unit 70, and the anti-leaning member and the cam member are biased by a spring. As compared with this conventional method, the present embodiment can eliminate such an anti-leaning member and save both space in the optical axis and a space in the radial direction, thus making it possible to reduce a total length of the lens barrel 30 and/or the camera 10 and to contribute to a reduction in diameter and miniaturization.

(4) As the leaf spring 76 is used, the biasing can be implemented with a simple construction and a small space.

(5) Since the leaf spring 76 is fixed by caulking, not using screw, it is possible to reduce the thickness of the cam member 72 in the direction of the optical axis and to secure a margin with respect to the aperture blades 73, while the weight of the cam member 72 and its inertia can be reduced.

(6) Since the tip of the leaf spring 76 is provided with a pinch section 76b, it is possible to prevent the leaf spring 76 from being disengaged from the driving projection section 62, so that reliable biasing can be achieved.

(7) Since the leaf spring 76 biases the vicinity of the portion where the driving projection section 62 is engaged with the first aperture projection section 74 (the vicinity of the L-shaped hook section 74a), the biasing is stabilized.

(Modification)

The above-described first embodiment can be modified as follows.

(1) Although an example of the leaf spring 76 has been described, the embodiment may be modified to provide a bias in the direction in which the driving projection section 62 and the first aperture projection section 74 come into contact with each other (in a direction in which the driving projection section 62 and the first aperture projection section 74 are facing to each other), for example, using rod-like spring, a ring-like spring and/or the like.

(2) Although an example where the leaf spring 76 is mounted on the cam member 72 has been described, the leaf spring 76 may be mounted on the aperture plate member 60, or may be mounted on both the cam member 72 and the aperture plate member 60.

(3) Although an example where the leaf spring 76 is fixed by caulking has been described, the leaf spring 76 may be fixed by other ways of fixation such as ways using screws and/or adhesive.

(4) Although an explanation has been given of an example where engagement between the driving projection section 62 and the first aperture projection section 74 is made near an intermediate location between the aperture unit 70 and the aperture plate member 60, such an engagement may be implemented at a location closer to either the aperture unit 70 or the aperture plate member 60.

(5) Although an explanation has been given of an example where arm-like members such as the driving projection section 62 and the first aperture projection section 74 are engaged with each other, one arm-like member may have a greater length than the one of this embodiment and the other may be a groove to engage the one with the other.

Figure 7:
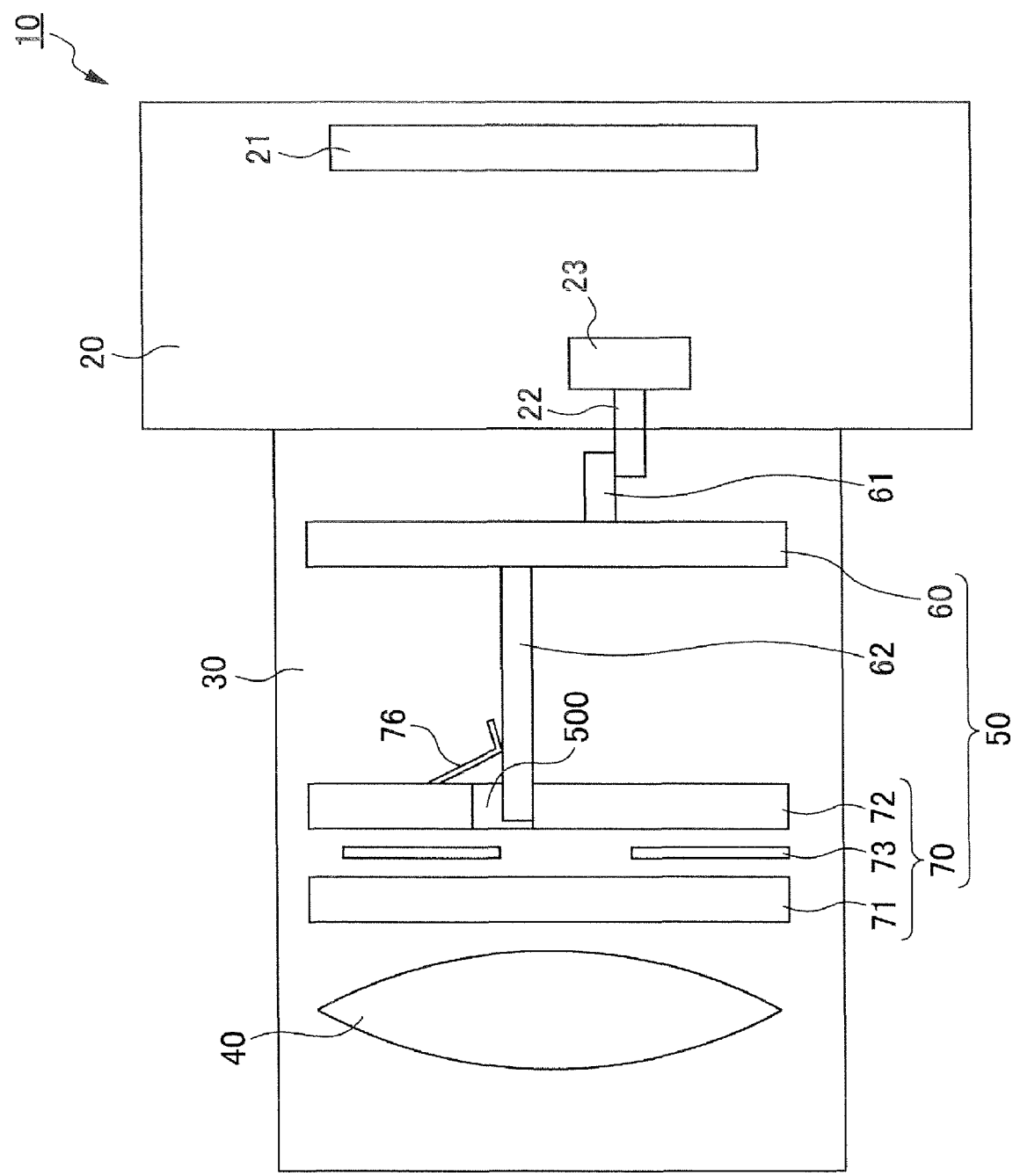
FIG. 7 shows an example in which one arm-like member is elongated and the other is formed in groove shape to engage the one with the other.
Figure 8:
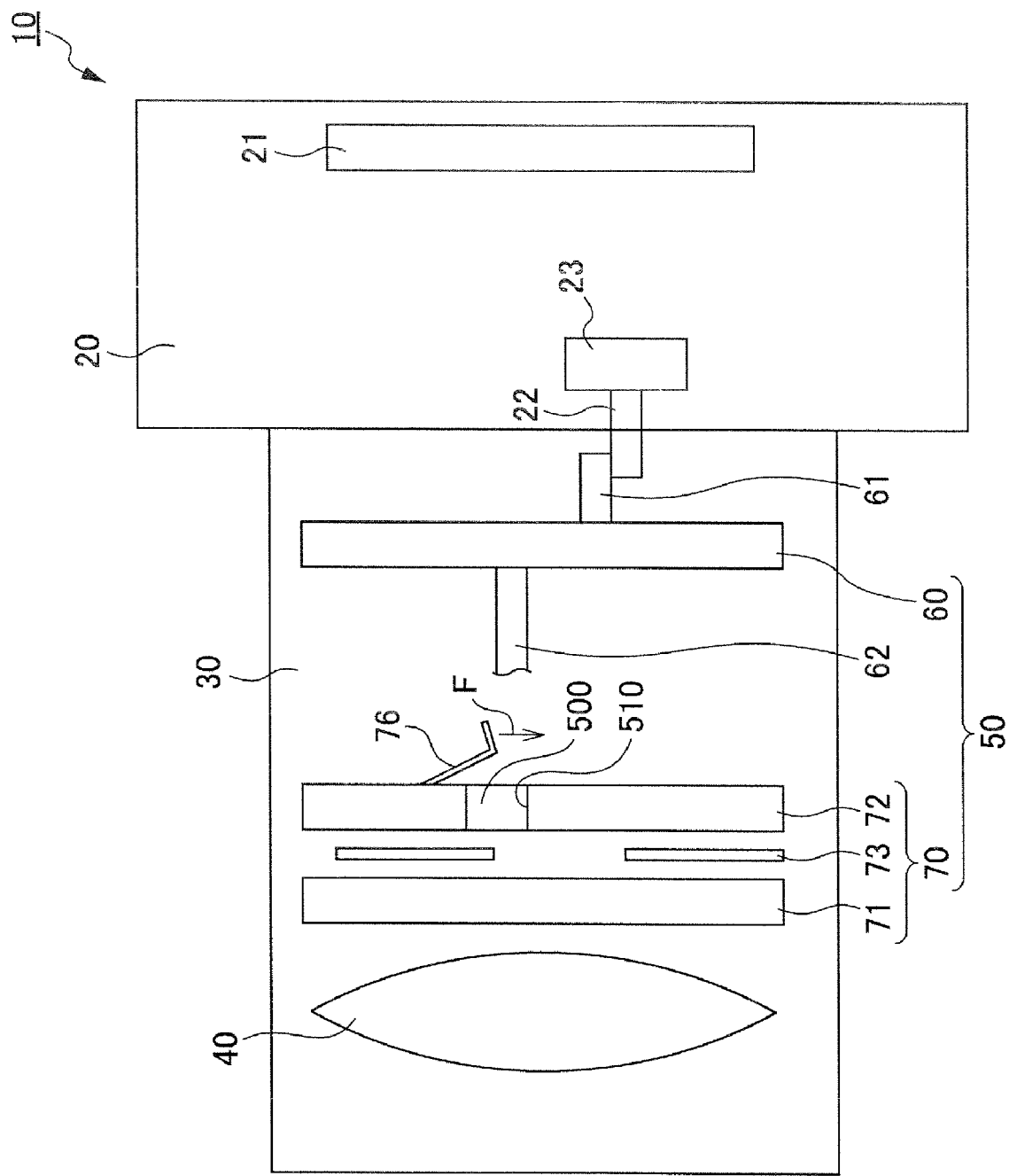
FIG. 8 shows an example in which one arm-like member is elongated and the other is formed in groove shape to engage the one with the other.

For instance, FIGS. 7 and 8 show an example in which one arm-like member (driving projection section 62) is elongated and the other is formed in groove shape to engage the one with the other. It is noted that a part of the driving projection section 62 is omitted from the illustration in FIG. 8. In FIGS. 7 and 8, the driving projection section 62 is inserted into a groove 500 of the cam member 72. The leaf spring 76 biases the driving projection section 62 with the biasing force F. The driving projection section 62 is biased by the leaf spring 76 and abutted onto an edge 510 of the groove 500.

Second Embodiment

Now, the second embodiment of the present invention will be described with reference to the drawings and the like. In the following, explanation of parts similar to those of the first embodiment will be omitted. In addition, reference numerals obtained by adding a hundred to the reference numerals in the first embodiment will be used as reference symbols to be given to the elements in the second embodiment.

Figure 3:
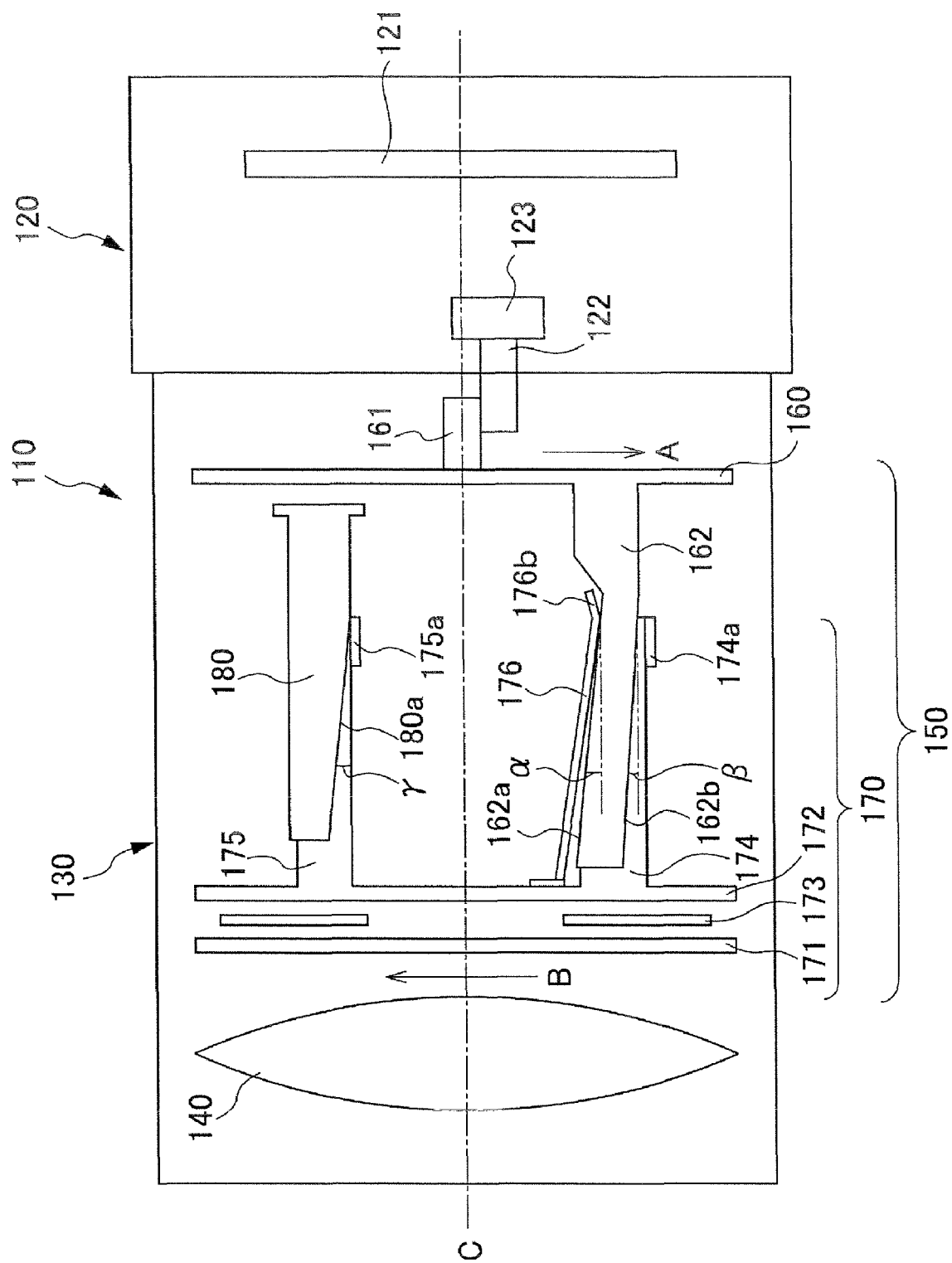
FIG. 3 is a schematic diagram showing the camera of the second embodiment.
Figure 4:
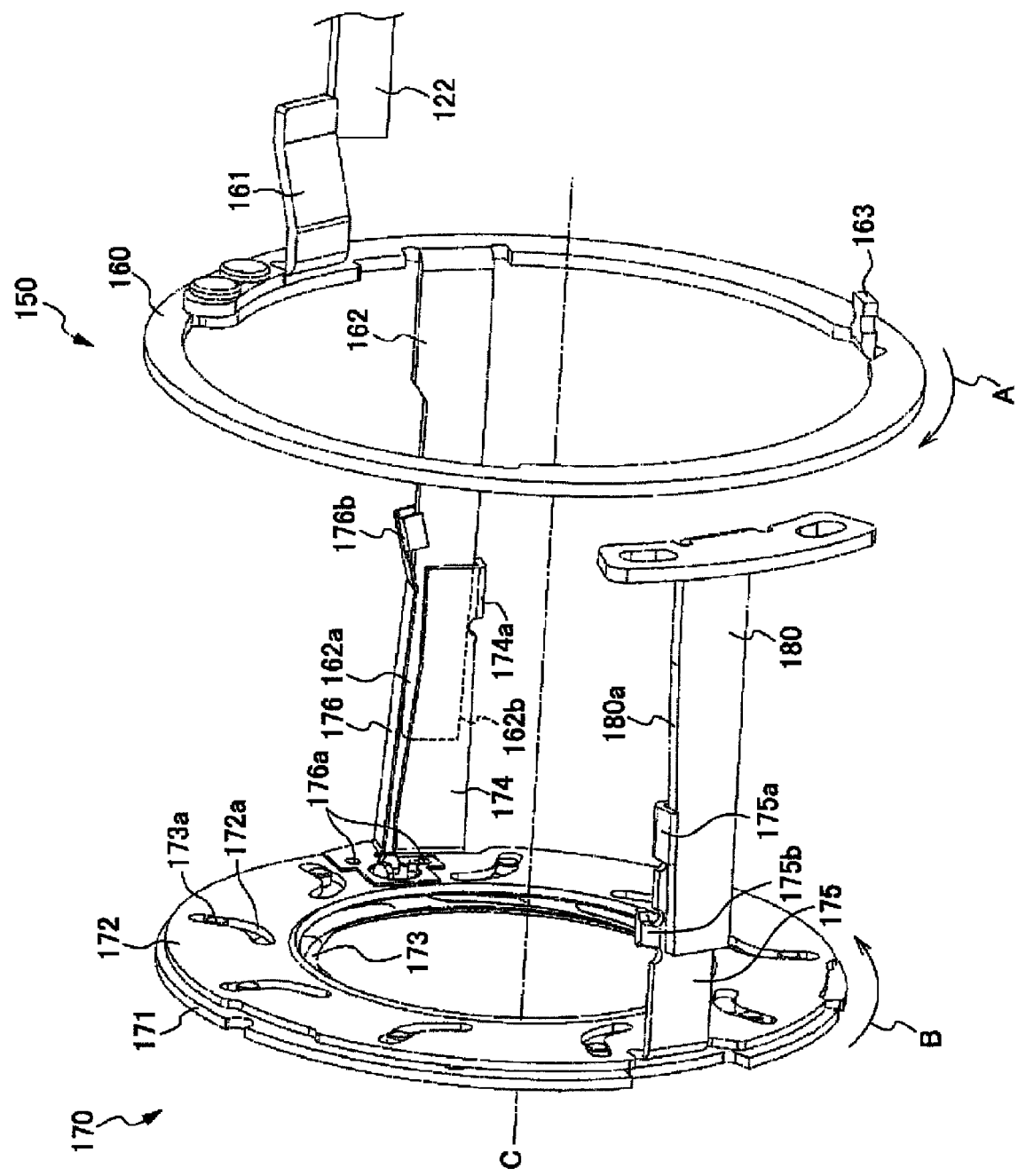
FIG. 4 is a perspective view of the aperture mechanism of the second embodiment.

FIG. 3 is a schematic diagram showing a camera 110 of the second embodiment. FIG. 4 is an illustration showing the details of an aperture mechanism 150 of the second embodiment. It is noted that a state in which a bottom end is cut and a front side is expanded upwards in FIG. 4 corresponds to FIG. 3.

As shown in FIG. 3, the driving projection section 162 is provided with a spring-side inclined surface 162a that is inclined at an angle $\alpha$ with respect to a line, parallel to a rotational axis C and on a cylindrical surface around the axis C, and comes in contact with a leaf spring 176 described later. In addition, on the opposite side to the spring-side inclined surface 162a, there is provided a projection-side inclined surface 162b that is inclined at an angle $\beta$ with respect to the rotational axis C. It should be noted that in the present embodiment, the angles $\alpha$ and $\beta$ incline in the same direction when viewed in a rotational direction about the rotational axis C, namely in the same direction with respect to a line parallel to the rotational axis C on the cylindrical surface around the axis C, and the angle $\alpha$ is greater than the angle $\beta$.

The L-shaped hook section 174a at the end of the first aperture projection section 174 is opposed to the projection-side inclined surface 162b of the driving projection 162. The pinch section 176b of the leaf spring 176 pinches the spring-side inclined surface 162a of the driving projection section 162 in a radial direction about the rotational axis C.

The rotation-limiting plate 180, as shown in FIG. 3, is provided with an F-value correction inclined surface 180a that is inclined at an angle $\gamma$ with respect to a line parallel to the rotation axis C on a cylindrical surface around the axis C and corrects the amount of rotation of the cam member 172 at the time of zoom operation. The angle $\gamma$ inclines in the same direction as in the angle $\alpha$ of the spring-side inclined surface 162a of the driving projection section 162 when viewed in a rotational direction about the rotational axis C, namely in the same direction with respect to a line parallel to the rotational axis C on the cylindrical surface around the axis C, and for example, the angle $\gamma$ is equal to the angle $\alpha$. Preferably, the angle $\gamma$ is greater than 0° and less than 10°, for example. The L-shaped hook section 175a of the second aperture projection section 175 slides along the F-value correction inclined surface 180a, so that the second aperture projection section 175 can rotate about the rotational axis C to correct the diameter of the aperture of the aperture unit 170.

Next, the operations of the second embodiment will be explained. The operation of the aperture mechanism 150 is the same as in the first embodiment. A difference from the first embodiment is the manner of correcting the diameter of the aperture associated with a zoom operation.

Figure 5A:
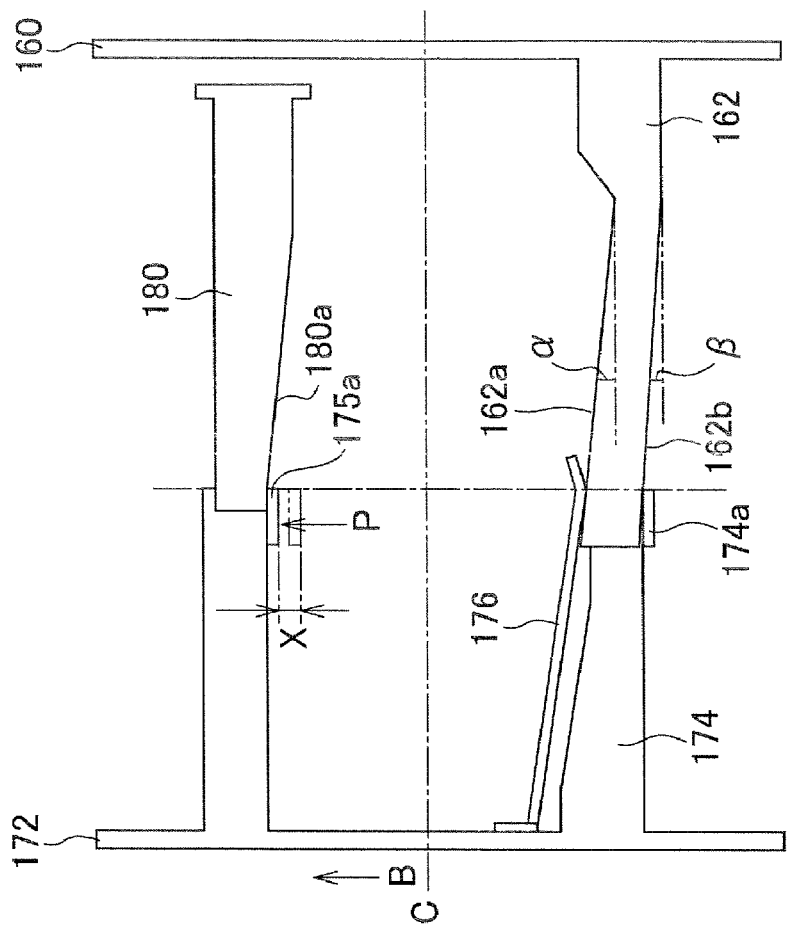
FIG. 5A is a diagrammatic illustration of the aperture mechanism of the second embodiment sowing the case of the wide angle end.
Figure 5B:
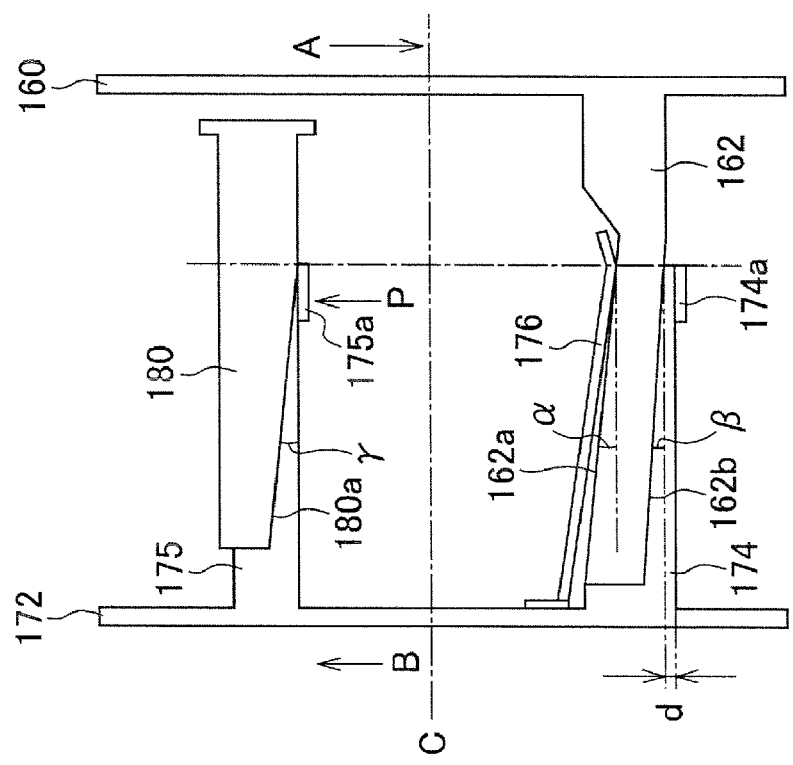
FIG. 5B is a diagrammatic illustration of the aperture mechanism of the second embodiment showing the case of the telephoto end.

An explanation will be given with reference to FIG. 5 concerning the correction of the diameter of the aperture opening of the aperture unit 170 in the case of changing the distance between the aperture plate member 160 and the aperture unit 170 in the event of a zoom operation. FIG. 5A is a diagrammatic illustration of the aperture mechanism showing the case where the zoom position is at the wide-angle end (Wide) and FIG. 5B showing the case where the zoom position is at the telephoto end (Tele). It should be noted that FIG. 5A and FIG. 5B correspond to a situation obtained by cutting an end portion of the figure and expanding its front side portion upward in FIG. 4.

2-a. Wide-Angle End

In the case where the zoom position shown in FIG. 5A is at the wide-angle end, the cam member 172 gets closest to the aperture plate member 160, and the L-shaped hook portion 175a abuts on the F-value correction inclined surface 180a at a proximal end portion of the F-value correction inclined surface 180a of the rotation-limiting plate 180, namely at the portion of the rotation-limiting plate 180 having the largest width in the circumferential direction about the rotational axis C. On the other hand, the driving projection section 162 abuts on the leaf spring 176 on the proximal end portion of the spring-side inclined surface 162a, and is biased downward in the figure. At the wide-angle end, the aperture blades 173 shown in FIG. 4 protrude from holes of the cam member 172 to some degree in such a manner that the aperture diameter becomes somewhat reduced from a maximal opened state. At the wide-angle end, the aperture mechanism 150 performs an aperture operation at the time of shooting with this state as the opened state.

Herein, the angle α and the angle β are inclined in the same direction with respect to the rotational axis C, and the angle α has a greater inclination than the angle β. That is, the width of the driving projection section 162 is the narrowest at the proximal end portion provided with the spring-side inclined surface 162a and the projection-side inclined surface 162b, and widens more towards its tip. For this reason, as shown in the figure, a clearance d occurs between the projection-side inclined surface 162b and the L-shaped hook portion 174b in the proximal end portion.

This clearance d causes the projection-side inclined surface 162b to be "not touching state", without immediately pressing the L-shaped hook portion 174b even if the aperture operation starts, and without being brought into contact with the L-shaped hook portion 174a for the clearance d. Then, the surface 162b is abutted against the L-shaped hook portion 174a to cause the first aperture projection portion 174 to move. At the wide-angle end, the aperture operation is performed in such a manner that the position where the pin 173a moves to some degree to the narrowed side, not the end on the opened side in the cam groove 172a, is regarded as the maximal opening position and this position is used as a reference. Such a not touching state is created, thus making it possible to correct the aperture diameter.

2-b. During Movement

As shown in FIGS. 5A and 5B, as the zoom position becomes more displaced towards the telephoto end, the distance between the aperture plate member 160 and the cam member 172 increases. Since the L-shaped hook portion 175a is biased in the direction of the arrow P in FIG. 5 by means of a spring hitched on the spring hitch portion 175b (see FIG. 4), it moves upward in the figure along the F-value correction inclined surface 180a while keeping abutment relation with the F-value correction inclined surface 180a of the rotation-limiting plate 180, and the cam member 172 moves in the direction of arrow B.

Besides, if the distance between the aperture plate member 160 and the cam member 172 increases, the tip of the leaf spring 176 also moves along the spring-side inclined surface 162a while pressing against the spring-side inclined surface 162a. On this occasion, the spring-side inclined surface 162a and the F-value correction inclined surface 180a are inclined in the same direction at the same angle, and therefore the force with which the leaf spring 176 presses the spring-side inclined surface 162a is invariable. In this way, since the leaf spring 176 presses against the spring-side inclined surface 162a with constant force, the operation of the aperture mechanism 150 can be performed with a constant load regardless of the distance between the aperture plate member 160 and the cam member 172, that is the focal length, thus leading to stabilized operation.

In addition, as the approach of the telephoto end progresses, the L-shaped hook section 175a moves along the F-value correction inclined surface 180a, the cam member 172 rotates in the direction of arrow B in the figure, and the aperture blades 173 retract between the supporting member 171 and the cam member 172, so that the aperture diameter gradually becomes greater. The zoom position can be stopped at any position during this approach, and while the state of the aperture diameter at the stopped position is used as a reference state, the aperture mechanism 150 can perform the above-described aperture operations.

At this point, the width of the driving projection section 162 becomes more expanded towards its tip. For this reason, the gap d is gradually decreased. Then, at each position, the projection-side inclined surface 162b keeps "not touching state" for the clearance d on the occasion of the aperture operation, and thereafter, presses the L-shaped hook portion 174a of the first aperture projection section 174 to move the first aperture projection section 174. Therefore, the movement of the pin 173a is adapted to follow the aperture operation smoothly even if the initial position of the pin 173a is a position that approaches a narrowed side to some degree in correspondence with the zoom position, not the position of the end on the open side in the cam groove 172a. For this reason, the aperture operation can be smoothly performed without interfere with the aperture operation.

2-c. Telephoto End

As shown in the FIG. 5B, if the zoom position reaches the telephoto end, the aperture blades 173 shown in FIG. 4 are completely accommodate between the supporting member 171 and the cam member 172, so that the aperture diameter becomes maximized. This means that the cam member 172 has moved a distance X shown in the FIG. 5B about the rotational axis C with respect to the aperture plate member 160 from a position on the wide-angle end.

Also in this situation, the spring-side inclined surface 162a and the F-value correction inclined surface 180a are inclined in the same direction at the same angle, and thereby the force of the leaf spring 176 pressing the spring-side inclined surface 162a is identical to the force of the leaf spring 176 pressing the spring-side inclined surface 162a at the wide-angle end, thus stabilizing the aperture operations.

Additionally, the width of the driving projection section 162 becomes the largest at its extremity, and there is no clearance d at the extremity. Therefore, the first aperture projection section 174 and the projection-side inclined surface 162b are in a contact state, and the movement of the pin 173a follows the aperture operation, so that the aperture operation is performed smoothly.

2-d. Comparative Example

Figure 6A:
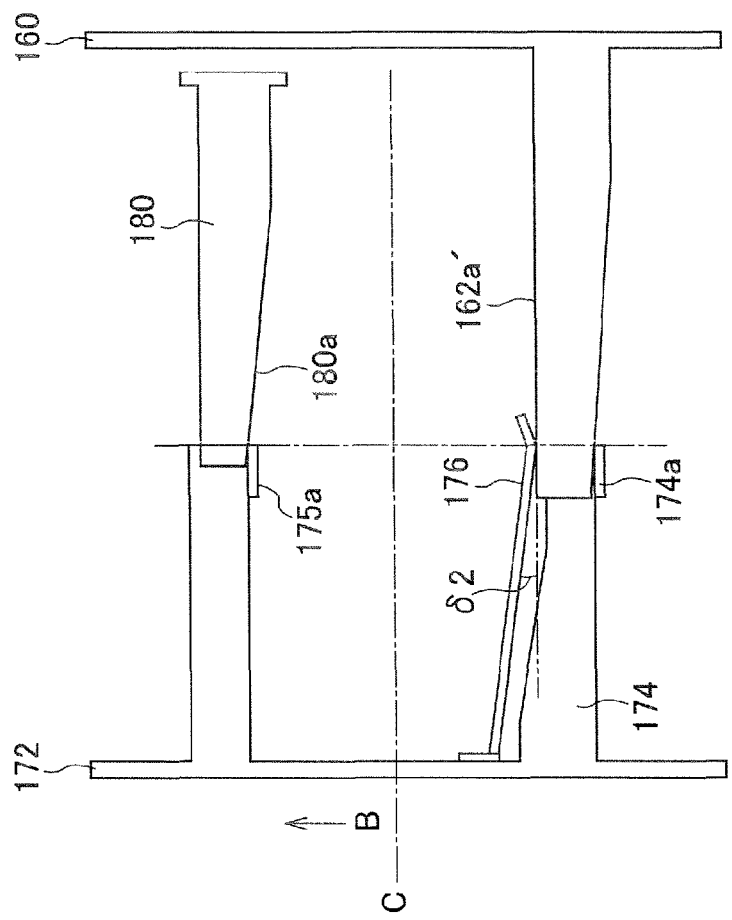
FIG. 6A shows a comparison example versus FIG. 5A, representing the case where a spring-side inclined surface is in parallel with a rotational axis.
Figure 6B:
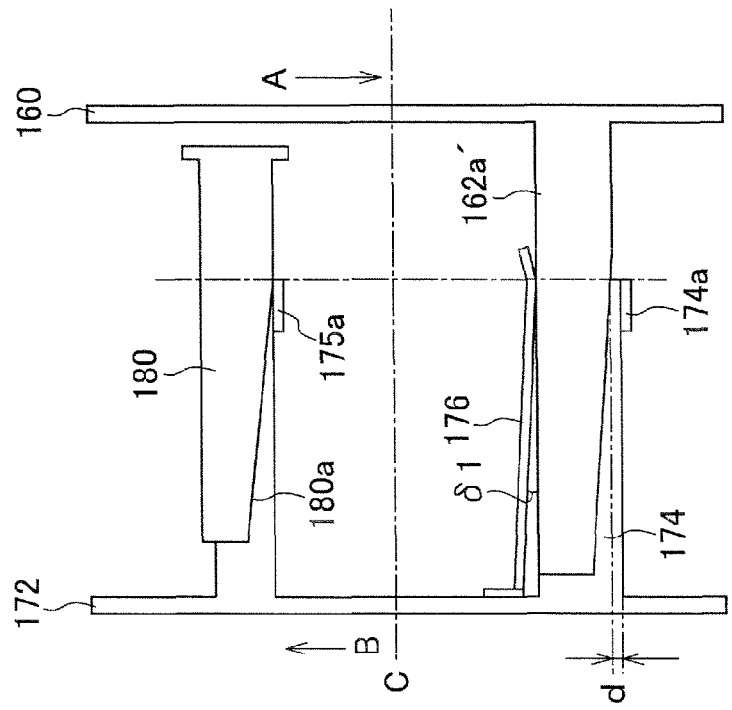
FIG. 6B shows a comparison example versus FIG. 5B, representing the case where a spring-side inclined surface is in parallel with a rotational axis.

For comparison, FIG. 6 shows a situation corresponding to FIG. 5 in the case where the spring-side inclined surface 162a' is parallel with the rotational axis C. In the case of movement from the wide-angle end of FIG. 6A to the telephoto end shown in FIG. 6B, as the L-shaped hook section 175a slides on the F-value correction inclined surface 180a of the rotation-limiting plate 180 and the cam member 172 moves in the direction of arrow B, the tip of the leaf spring 176 also moves along the spring-side inclined surface 162a' while pressing against the spring-side inclined surface 162a'. On this occasion, since the spring-side inclined surface 162a' is in parallel with the rotational axis C, the angle at which the tip of the leaf spring 176 abuts against the spring-side inclined surface 162a' gradually increases from the angle δ1 to the angle δ2. Therefore, the force for the leaf spring 176 to press against the spring-side inclined surface 162a fluctuates.

According to the second embodiment, the following advantages are offered in addition to the advantages of the first embodiment.

(1) The spring-side inclined surface 162a and the F-value correction inclined surface 180a are inclined in the same direction at the same angle as viewed in a rotational direction about the rotational axis C. For this reason, the biasing force is constant and does not influence the aperture operations.

(Modification)

Furthermore, the second embodiment may be modified as follows in addition to the modifications mentioned in the first embodiment.

(1) In the present embodiment, the inclination of the F-value correction inclined surface 180a and the inclination of the spring-side inclined surface 162a are identical with respect to the rotational axis C, but the invention is not limited to this. For example, the angles of the inclinations may be different so long as the F-value correction inclined surface 180a and the spring-side inclined surface 162a are inclined in the same direction. Even in this example, there is an advantage that fluctuation of the biasing force of the spring is reduced (the fluctuation of the pressing force of the spring is reduced).

(2) The spring-side inclined surface 162a and the projection-side inclined surface 162b of the driving projection section 162 have different inclinations in the present embodiment, but the invention is not limited to this condition. For example, the spring-side inclined surface 162a and the projection-side inclined surface 162b may be parallel to each other. In this example, the driving projection section 162 is easy to manufacture.

It should be noted that the above-described embodiments and modifications may be combined as appropriate, but their detailed explanations are omitted. In addition, the present invention should not be restricted by the embodiments and modifications described in the foregoing.

What is claimed is:

1. An aperture mechanism comprising:
   a first member to rotate in accordance with aperture operation;
   a rotation regulating section having a first inclined surface inclined with respect to a rotational axis of the first member to regulate rotation of the first member; and
   a second member having a second inclined surface that is inclined with respect to the rotational axis and transfers a rotational driving force between the second inclined surface and the first member, and a third inclined surface provided on a side opposite to the second inclined surface, to rotate in accordance with aperture operation; wherein
   the first member has a projection section opposed to the third inclined surface; and
   the inclination of the third inclined surface with respect to a line parallel with the rotational axis is smaller than the inclination of the second inclined surface, and when the first member and the second member move relatively along the rotational axis in a direction in which an aperture becomes small, a clearance occurs between the third inclined surface and the projection section.

2. The aperture mechanism according to claim 1, comprising a biasing member, fixed to the first member, being capable of abutting against the second inclined surface, and giving a biasing force to the second inclined surface.

3. An optical apparatus comprising the aperture mechanism according to claim 1.

4. An aperture mechanism comprising:
   a first member to rotate in accordance with aperture operation;
   a rotation regulating section having a first inclined surface inclined with respect to a rotational axis of the first member, to regulate rotation of the first member; and
   a second member having a second inclined surface that is inclined with respect to the rotational axis and transfers a rotational driving force between the second inclined surface and the first member, and a third inclined surface provided on a side opposite to the second inclined surface, to rotate in accordance with aperture operation; wherein
   the first member has an abutting section capable of abutting against the third inclined surface, and
   when a photographing device has a predetermined focal length, the third inclined surface and the abutting section abut against each other.

5. The aperture mechanism according to claim 4, wherein when the photographing device has a focal length shorter than a predetermined focal length, the third inclined surface and the abutting section do not abut against each other.

6. The aperture mechanism according to claim 4, comprising a biasing member, fixed to the first member, being capable of abutting against the second inclined surface, and giving a biasing force to the second inclined surface.

7. An optical apparatus comprising the aperture mechanism according to claim 4.

8. An aperture mechanism comprising:
   a first member to rotate in accordance with an aperture operation;
   a rotation regulating section having a first inclined surface inclined with respect to a rotational axis of the first member, to regulate rotation of the first member;
   a second member having a second inclined surface that is inclined with respect to the rotational axis and a third inclined surface provided on a side opposite to the second inclined surface, to rotate in accordance with the aperture operation; wherein
   the first member has an abutting section capable of abutting against the third inclined surface, and
   when a photographing device has a predetermined focal length, the third inclined surface and the abutting section abut against each other.

9. The aperture mechanism according to claim 8, comprising a biasing member, fixed to the first member, being capable of abutting against the second inclined surface, and giving a biasing force to the second inclined surface.

10. An optical apparatus comprising the aperture mechanism according to claim 8.

11. An aperture mechanism comprising:
    a driving member to be driven in accordance with an aperture operation;
    an aperture member forming an aperture to be driven by the driving member;
    a first engagement section that is a projection arranged on at least one of the driving member and the aperture member;

a second engagement section that is a projection arranged on another of the driving member and the aperture member and that engages with the first engagement section; and a biasing member that is a leaf spring arranged, between the driving member and the aperture member, to oppose at least one of the first engagement section and the second engagement section, to provide a bias in a direction in which the first engagement section and the second engagement section come into contact with each other.

12. The aperture mechanism according to claim 11, wherein the biasing member is fixed by caulking.

13. The aperture mechanism according to claim 11, wherein the biasing member is provided with a disengagement prevention section to prevent the biasing member from being disengaged from an object to be biased.

14. The aperture mechanism according to claim 11, wherein the biasing member is arranged approximately along an optical axis.

15. The aperture mechanism according to claim 11, wherein the biasing member is a cantilever spring, having one end fixed to at least one of the driving member and the aperture member, and another end biasing another of the first engagement section and the second engagement section.

16. The aperture mechanism according to claim 11, wherein the first engagement section has a first inclined surface that can slide against the biasing member accompanying a change of focal length.

17. The aperture mechanism according to claim 16, comprising a rotation regulating section having a second inclined surface that is inclined at approximately the same angle as the first inclined surface, to regulate rotation of the aperture member.

18. The aperture mechanism according to claim 17, wherein the first engagement section has a third inclined surface, arranged on a side opposite to the first inclined surface, to abut the second engagement section.

19. The aperture mechanism according to claim 11, wherein the biasing member is a leaf spring arranged approximately along an optical axis.

20. An optical apparatus comprising the aperture mechanism according to claim 11.

21. An aperture mechanism comprising:
a first member to rotate in accordance with an aperture operation;
a rotation regulating section having a first inclined surface that is inclined with respect to the rotational axis of the first member, to regulate rotation of the first member;
a second member having a second inclined surface that is inclined with respect to the rotational axis and a third inclined surface that is provided on a side opposite the second inclined surface, to rotate in accordance with the aperture operation; and
a biasing member that can slide against the second inclined surface accompanying a change of focal length; wherein
The first member has a projection section opposed to the third inclined surface; and
The biasing member supplies a biasing force to the second inclined surface in a direction in which the third inclined surface is made to come into contact with the projection section.

22. The aperture mechanism according to claim 21, wherein the first inclined surface and the second inclined surface are inclined in the same direction from the viewpoint of the rotational direction about the rotational axis.

23. The aperture mechanism according to claim 21, wherein the first member comprises a biasing member to bias the second inclined surface of the second member.

24. An optical apparatus comprising the aperture mechanism according to claim 21.

25. An aperture mechanism provided with:
a driving member to be driven in accordance with an aperture operation;
a rotation regulating section having a first inclined surface inclined with respect to a rotational axis of the aperture member, to regulate rotation of the aperture member;
a first engagement section arranged in at least one of the driving member and the aperture member, the first engagement section having a second inclined surface inclined with respect to a rotational axis of the aperture member;
a second engagement section arranged in another of the driving member and the aperture member, and engaged with the first engagement section; and
a biasing member fixed to another of the driving member and the aperture member, being capable of sliding against the second inclined surface accompanying a change of focal length, to give a biasing force to the second inclined surface in a direction so that the first engagement section comes into contact with the second engagement section.

26. The aperture mechanism according to claim 25, wherein the first inclined surface and the second inclined surface are inclined at approximately the same angle.

27. An optical apparatus comprising the aperture mechanism according to claim 25.

28. A manufacturing method for an aperture mechanism, including steps of:
providing a first engagement section on at least one of a driving member driven in accordance with an aperture operation and an aperture member having an aperture to be driven by the driving member;
providing a second engagement section to be engaged with the first engagement section at another of the driving member and the aperture member; and
providing a biasing member to bias the first engagement section in a direction in which the first engagement section and the second engagement section face each other, on at least one of the driving member and the aperture member, being capable of sliding against the first engagement section accompanying a change of focal length.

29. The manufacturing method for an aperture mechanism according to claim 28, wherein at least one of the first engagement section and the second engagement section is a projection.

30. A manufacturing method for an aperture mechanism, including steps of:
disposing a rotation regulating section having a first inclined surface inclined with respect to a rotational axis of a first member that rotates in accordance with an aperture operation, in such a manner that rotation of the first member can be regulated; and
disposing a second member having a second inclined surface that is inclined with respect to the rotational axis, and a third inclined surface arranged on a side opposite to the second inclined surface, in such a manner that the second member that rotates in accordance with an aperture operation, can rotate in accordance with the aperture operation;

providing an abutting section at the first member; and causing a biasing member to abut the second inclined surface so that a biasing force is generated in a direction such that the third inclined surface comes in contact with the abutting section.

31. The manufacturing method for an aperture mechanism according to claim 30, wherein the first inclined surface and the second inclined surface are inclined at approximately the same angle.

* * * * *